(12) United States Patent
Fu et al.

(10) Patent No.: US 11,645,576 B2
(45) Date of Patent: May 9, 2023

(54) CODE COMPLETION FOR LANGUAGES WITH HIERARCHICAL STRUCTURES

(71) Applicant: MICROSOFT TECHNOLOGY LICENSING, LLC., Redmond, WA (US)

(72) Inventors: Shengyu Fu, Redmond, WA (US); Neelakantan Sundaresan, Bellevue, WA (US); Ying Zhao, Bellevue, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 1052 days.

(21) Appl. No.: 16/391,284

(22) Filed: Apr. 22, 2019

(65) Prior Publication Data

US 2019/0332968 A1   Oct. 31, 2019

Related U.S. Application Data

(60) Provisional application No. 62/664,191, filed on Apr. 29, 2018.

(51) Int. Cl.
*G06F 9/44*    (2018.01)
*G06F 9/455*   (2018.01)
*G06F 9/445*   (2018.01)
*G06N 20/00*   (2019.01)
(Continued)

(52) U.S. Cl.
CPC ............... *G06N 20/00* (2019.01); *G06F 8/30* (2013.01); *G06F 8/33* (2013.01)

(58) Field of Classification Search
CPC .............. G06N 20/00; G06F 8/30; G06F 8/33
See application file for complete search history.

(56) References Cited

U.S. PATENT DOCUMENTS

| 7,117,436 B1 * | 10/2006 | O'Rourke | G06F 16/958 |
| | | | 707/E17.116 |
| 9,703,675 B2 * | 7/2017 | Reid, III | G06F 11/3636 |
| 9,886,518 B1 * | 2/2018 | Xu | G06F 16/986 |

(Continued)

FOREIGN PATENT DOCUMENTS

| CN | 106326260 A | * | 1/2017 | .......... G06F 16/489 |
| CN | 107957872 A | * | 4/2018 | |

(Continued)

OTHER PUBLICATIONS

Andrea Renika D' Souza, Collective Intelligence for Smarter API Recommendations in Python, 2016, pp. 51-60. https://ieeexplore.ieee.org/document/7781796 (Year: 2016).*

(Continued)

*Primary Examiner* — Mongbao Nguyen

(57) ABSTRACT

A code completion system predicts candidates to complete a code fragment with a tag name and/or an attribute name in source code written in a hierarchically-structured language. Candidates for predicting a tag name are based on a first-order tag Markov chain model generated from usage patterns of relationships of tag names found in a training dataset. Candidates for predicting an attribute name are based on a second-order attribute Markov chain model generated from usage patterns of sequences of attribute names associated with each tag name found in the training dataset.

20 Claims, 8 Drawing Sheets

(51) Int. Cl.
 G06F 8/30 (2018.01)
 G06F 8/33 (2018.01)

(56) References Cited

U.S. PATENT DOCUMENTS

| | | | |
|---|---|---|---|
| 10,545,928 B2* | 1/2020 | Gharib | G06F 40/258 |
| 2008/0320444 A1 | 12/2008 | Meijer et al. | |
| 2011/0283257 A1 | 11/2011 | Charisius et al. | |
| 2013/0294651 A1 | 11/2013 | Zhou et al. | |
| 2014/0173563 A1 | 6/2014 | Dias et al. | |
| 2014/0208296 A1 | 7/2014 | Dang et al. | |
| 2015/0135166 A1* | 5/2015 | Tarlow | G06F 11/3604 |
| | | | 717/124 |
| 2015/0378692 A1 | 12/2015 | Dang et al. | |
| 2017/0371629 A1 | 12/2017 | Chacka et al. | |
| 2018/0063265 A1* | 3/2018 | Crossley | H04L 67/535 |
| 2018/0113780 A1 | 4/2018 | Kim et al. | |
| 2019/0227774 A1 | 7/2019 | Banuelos et al. | |
| 2019/0303108 A1 | 10/2019 | Fu et al. | |
| 2019/0303109 A1 | 10/2019 | Fu et al. | |
| 2020/0272426 A1 | 8/2020 | Fu et al. | |

FOREIGN PATENT DOCUMENTS

| | | | | |
|---|---|---|---|---|
| WO | 2015022009 A1 | 2/2015 | | |
| WO | WO-2017043664 A1 * | 3/2017 | | G06F 8/38 |
| WO | WO-2017212726 A1 * | 12/2017 | | G06F 13/00 |

OTHER PUBLICATIONS

Veselin Raychev, Code Completion with Statistical Language Models, 2014, pp. 1-10. https://dl.acm.org/doi/pdf/10.1145/2666356.2594321 (Year: 2014).*
Matthias Hoschele, Mining Input Grammars with AUTOGRAM, 2017, pp. 1-4. https://ieeexplore.ieee.org/stamp/stamp.jsp?tp=&arnumber=7965250 (Year: 2017).*
"Final Office Action Issued In U.S. Appl. No. 15/939,742", dated Nov. 5, 2019, 26 Pages.
"Non Final Office Action Issued In U.S. Appl. No. 15/939,742", dated Jun. 10, 2019, 19 Pages.
Agrawal, et al., "Mining Association Rules between Sets of Items in Large Databases", In Proceedings of the ACM SIGMOD Conference on Management of Data, May 25, 1993, 10 Pages.
Alnusair, et al., "Effective API Navigation and Reuse", In Proceedings of IEEE International Conference on Information Reuse and Integration, Aug. 4, 2010, pp. 1-8.
Bruch, et al., "Learning from Examples to Improve Code Completion Systems", In Proceedings of the 7th Joint Meeting of the European Software Engineering Conference and the ACM SIGSOFT Symposium on the Foundations of Software Engineering, Aug. 23, 2009, 10 Pages.
Cergani, et al., "Addressing Scalability in API Method Call Analytics", In Proceedings of the 2nd International Workshop on Software Analytics. ACM, Nov. 13, 2016, 7 Pages.
Cover, et al., "Nearest Neighbor Pattern Classification", In Transactions on Information Theory, vol. 13, Issue 1, Jan. 1967, pp. 21-27.
D'Souza, et al., "Collective Intelligence for Smarter API Recommendations in Python", In Proceedings of 16th International Working Conference on Source Code Analysis and Manipulation, Oct. 2, 2016, pp. 51-60.
Gvero, et al., "Complete Completion Using Types and Weights", In Proceedings of 34th ACM SIGPLAN Conference on Programming Language Design and Implementation, Jun. 16, 2013, pp. 27-38.
Mandelin, et al., "Jungloid Mining: Helping to Navigate the API Jungle", In Proceedings of the ACM SIGPLAN conference on Programming language design and implementation, Jun. 12, 2005, 14 Pages.

Marasoiu, et al., "An Empirical Investigation Of Code Completion Usage By Professional Software Developers", In Proceedings of 26th Annual Workshop on Psychology of Programming Interest Group, Jul. 15, 2015, 12 Pages.
Mobasher, et al., "Using Sequential and Non-Sequential Pattern in Predictive web Usage Mining Tasks*", In Proceedings of International Conference on Data Mining, Dec. 9, 2002, 4 Pages.
Murphy, et al., "How Are Java Software Developers Using The Elipse IDE?", In Journal of IEEE Software, vol. 23, Issue 4, Jul. 17, 2006, pp. 76-83.
"International Search Report and Written Opinion Issued in PCT Application No. PCT/US2019/013417", dated Apr. 4, 2019, 17 Pages.
Perelman, et al., "Type Directed Completion of Partial Expressions", In Proceedings of the 33rd ACM SIGPLAN Conference on Programming Language Design and Implementation, Jun. 11, 2012, pp. 275-286.
Proksch, et al., "Intelligent Code Completion With Bayesian Network", In Transactions on Software Engineering and Methodology, vol. 25, Issue 1, Dec. 2015, 31 Pages.
Radev, et al., "Evaluating Web-based Question Answering Systems", In Proceedings of the Third International Conference on Language Resources and Evaluation, May 29, 2002, 4 Pages.
Zimdars, et al., "Using Temporal Data for Making Recommendations", In Proceedings of the Seventeenth Conference on Uncertainty in Artificial Intelligence, Aug. 2, 2001, pp. 580-588.
Raychev, et al., "Code completion with statistical language models", In Proceedings of ACM SIGPLAN Conference on Programming Language Design and Implementation, Jun. 9, 2014, pp. 419-428.
Robillard, Martin P., "What Makes APIs Hard to Learn? Answers from Developers", In Journal of IEEE Software, vol. 26, Issue 6, Nov. 2009, pp. 27-34.
Shani, et al., "An MDP-based Recommender System", In Journal of Machine Learning Research, Sep. 6, 2005, pp. 1265-1295.
Thummalapenta, Suresh, et al., "Parseweb: A Programmer Assistant for Reusing Open Source Code on the Web", In Proceedings of 22nd IEEE/ACM International Conference on Automated Software Engineering, Nov. 5, 2007, pp. 204-213.
Zhong, et al., "MAPO: Mining and Recommending API Usage Patterns", In Proceedings of the 23rd European Conference on Object-Oriented Programming, Jul. 6, 2009, 25 Pages.
"International Search Report and Written Opinion Issued in PCT Application No. PCT/US20/023038", dated Jul. 14, 2020, 14 Pages.
Savchenko, et al., "Statistical Approach to Increase Source Code Completion Accuracy", In Proceedings of the International Andrei Ershov Memorial Conference on Perspectives of System Informatics, Jan. 18, 2018, pp. 352-363.
Svyatkovskiy, et al., "Pythia: AI-Assisted Code Completion System", In Journal of Computing Research Repository, Nov. 29, 2019, 13 Pages.
"Notice of Allowance Issued in U.S. Appl. No. 15/939,742", dated Jan. 28, 2020, 16 Pages.
"Non Final Office Action Issued in U.S. Appl. No. 16/396,686", dated Apr. 6, 2020, 26 Pages.
Sebastiani, Fabrizio, "Machine Learning in Automated Text Categorization", In Journal of ACM Computing Surveys, vol. 34, Issue 1, Mar. 1, 2002, 47 Pages.
"Final Office Action Issued in U.S. Appl. No. 16/360,008", dated Oct. 5, 2020, 32 Pages.
"Non Final Office Action Issued in U.S. Appl. No. 16/396,686", dated Oct. 19, 2020, 23 Pages.
Non-Final Office Action Issued in U.S. Appl. No. 16/360,008, dated Jun. 19, 2020, 33 Pages.
Asaduzzaman et al., "Exploring API Method Parameter Recommendations", In Proceedings of the IEEE International Conference on Software Maintenance and Evolution, Sep. 29, 2015, 10 Pages.
"Notice of Allowance issued in U.S. Appl. No. 16/360,008", dated Dec. 28, 2020, 18 Pages.

* cited by examiner

```
SOURCE CODE 200

10  <Window x:Class = "HelloWorld.MainWindow"
11      xmlns = "http://schemas.microsoft.com/winfx/2006/xaml/presentation"
12      xmlns:x = "http://schemas.microsoft.com/winfx/2006/xaml"
13      xmlns:d = "http://schemas.microsoft.com/expression/blend/2008"
14      xmlns:mc = "http://schemas.openxmlformat.org/markup-compatibility/2006"
15      xmlns:local = "clr-namespace:HelloWorld"
16      mc:Ignorable="d"
17      Title="MainWindow" Height="350" Width="525" Icon="app.ico">
18
19      <Grid>
20          <TextBlock VerticalAlignment="Center" HorizontalAlignment="Center">
21              Hello,World!
22          </TextBlock>
23      </Grid>
24
25  </Window>
```

*FIG. 2A*

JSON FILE 202

```
[{
"Repo": "E:\\GitHubRepos\\WPF-Samples\\Getting Started",
"Solution": "E:\\GitHubRepos\\WPF-Samples\\Getting Started\\GettingStarted.sln",
"Project": "HelloWorld",
"Document": "MainWindow.xaml",
"References": [
  {
    "Tag": "Window",
    "Parents": [ null, null ],
    "Sisters": [null, null ],
    "Attributes": [
      "x:Class",
      "xmlns",
      "xmlns:x",
      "xmlns:d",
      "xmlns:mc",
      "xmlns:local",
      "Title",
      "Height",
      ".Width",
      "Icon" ]
  },
  {
    "Tag": "Grid",
    "Parents": [ "Window", null ],
    "Sisters": [ null, null ],
    "Attributes": []
  },
  {
    "Tag": "TextBlock",
    "Parents": ["Grid", "Window" ],
    "Sisters": [ null, null ],
    "Attributes": [".VerticalAlignment",
      "HorizontalAlignment"]
  },
]}]
```

*FIG. 2B*

```
TAG/ATTRIBUTE
MODEL 204
66  "ModelName": "XAML_$base$",
67  "model": {
68    "TagModel": {
69      "null": ["Window"],
70      "Window": ["Grid"],
71      "Grid": ["TextBlock"],
72    },
73    "AttributeModel": {
74      "Window": {
75        "N": ["x:Class"],
76        "N~x:Class": ["xmlns"],
77        "x:Class~xmlns": ["xmlns:x"],
78        "xmlns~xmlns:x": ["xmlns:d"],
79        "xmlns:x~xmlns:d": ["xmlns:mc"],
80        "xmlns:d~xmlns:mc": ["xmlns:local"],
81        "xmlns:mc~xmlns:local": ["Title"],
82        "xmlns:local~Title": ["Height"],
83        "Title~Height": ["Width"],
84        "Height~Width": ["Icon"]
85    },
86    "TextBlock": {
87      "N": ["VerticalAlignment"],
88      "N~VerticalAlignment": ["HorizontalAlignment"]
89    }
90  }}}
```

*FIG. 2C*

CODE COMPLETION FOR LANGUAGES WITH HIERARCHICAL STRUCTURES

CROSS-REFERENCE TO RELATED APPLICATIONS

The present application claims the benefit of U.S. Provisional Application having Ser. No. 62/664,191 filed on Apr. 29, 2018.

BACKGROUND

Software development environments are often used to aid software developers (i.e., users, programmers, etc.) to develop program code. The software development environment may include a source code editor and other tools that the developers utilize to write and test their programs. Some software development environments provide assistance for the developer to write code by automatically presenting a list of possible candidates based on one or more characters (e.g., letters, symbols, etc.) that a developer has typed into a source code editor. A popup menu may appear with several suggested code elements, phrases, or entities that the developer may utilize. This assistance is beneficial since it speeds up the development time and reduces common errors, such as typos. However, the automatic code completion feature may be problematic when there is a large list of candidates which may not be relevant and/or which may be too lengthy for a developer to browse through to find the right element.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code completion system predicts candidates to complete a code fragment with a tag name and/or an attribute name in source code written in a hierarchically-structured language (e.g., XAML). Candidates for predicting a tag name are based on a first-order tag Markov chain model generated from usage patterns of sequences of tag names found in various programs. The tag Markov chain model is used to predict the tag name most likely to complete a marker character as a user types based on the parent tag name preceding the marker character.

Candidates for predicting an attribute name are based on a second-order attribute Markov chain model generated from usage patterns of sequences of attribute names associated with each tag name found in various programs. The attribute Markov chain model is used to predict the attribute name most likely to succeed a marker character based on a preceding tag name and a sequence of preceding attribute names.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 2A is an exemplary source code listing used to illustrate the extraction of features for training data.

FIG. 2B is an exemplary source code listing of the extracted features from the source code shown in FIG. 2A.

FIG. 2C illustrates an exemplary tag/attribute model embodied in an XAML file.

DETAILED DESCRIPTION

Overview

Figure 1:
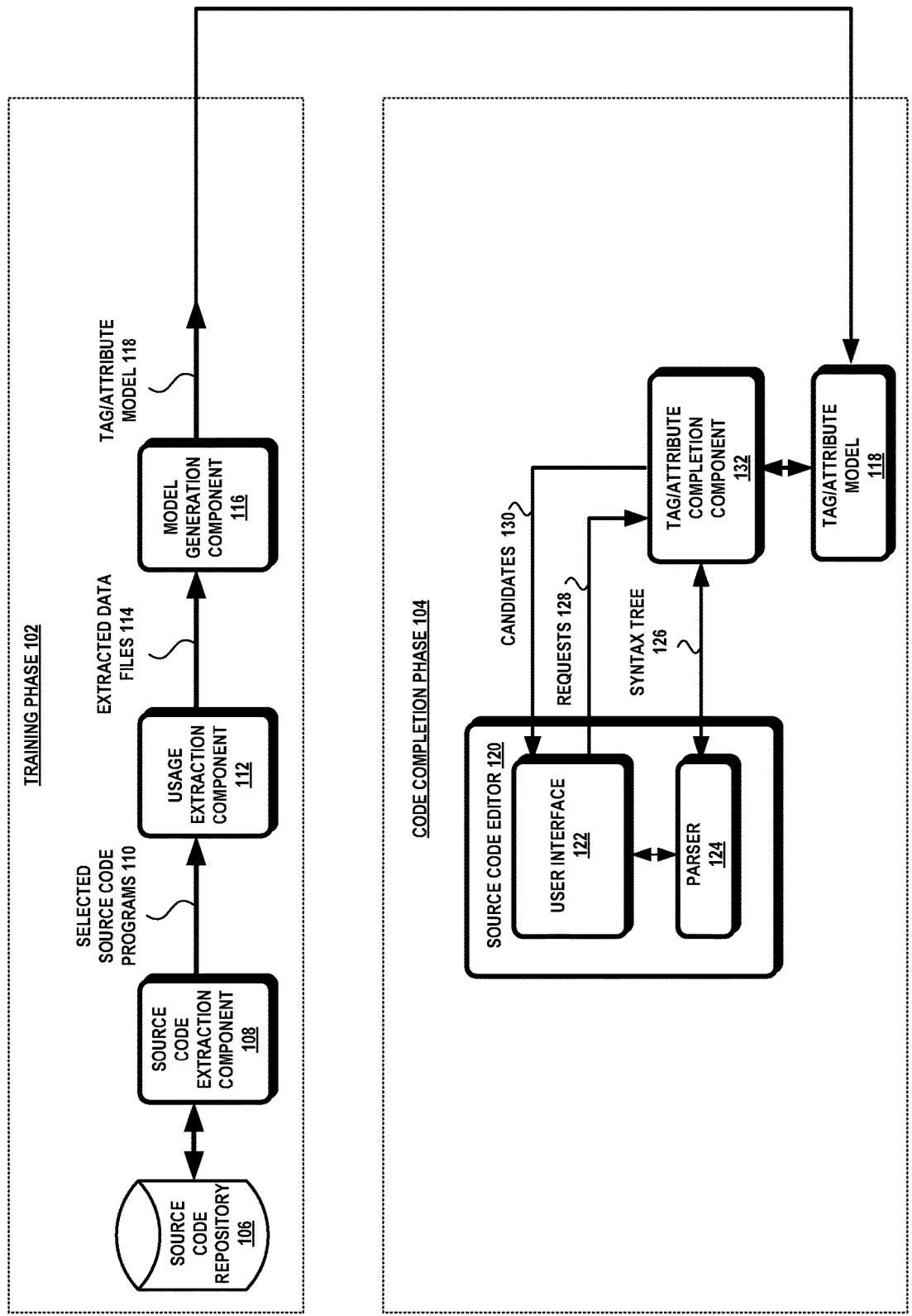
FIG. 1 illustrates an exemplary system including a training phase used to train a tag/attribute machine learning model and a code completion phase that uses the machine learning model in code completion system.

The subject matter disclosed pertains to a code completion system that predicts candidates to complete a code fragment with a tag name and/or an attribute name in source code written in a hierarchically-structured computer language.

A hierarchically-structured computer language is a declarative language that expresses the logic of a computation without specifying the control flow of the program. Examples of hierarchically-structured computer languages include markup languages, such as eXtensible Markup Language (XML), eXtensible Application Markup Language (XAML), JavaScript Object Notation (JSON), HyperText Markup Language (HTML), etc. XML is a markup language that defines a set of rules for encoding documents. XAML is a markup language used to initialize structured values and objects. HTML is a markup language for creating web pages and web applications. JSON is a file format to transmit text objects consisting of attribute-value pairs and array data types.

In these languages, tags are used to define elements within a document and attributes are used to contain data specific to a particular element. The relationships between the objects or elements is facilitated through a hierarchical ordering. The hierarchical ordering is transformed into a sequence which can be modeled by a Markov chain model and used to predict tag and attribute names to complete a code fragment.

The sequences represented by the Markov chain models represent relationships between the elements. This differs from models that represent ordered sequences of elements (e.g., method) in programming language statements that execute in a sequential order. For example, the attribute name sequence is not restricted to a particular order within a tag block, such as attribute $name_1$ having to appear before attribute $name_2$. The tag/attribute model considers the sequence attribute $name_1$ followed by attribute $name_2$ equivalent to attribute $name_2$ followed by attribute $name_1$ when both attributes are used in the same tag element. The tag/attribute model contains an entry for both sequences, $attribute_1$~$attribute_2$ and $attribute_2$~$attribute_1$. For the tag names, the Markov chain model represents the hierarchical relationship between the tags and not a control flow order.

Code completion is an automatic process of predicting the rest of a code fragment as the user is typing. Code completion speeds up the code development time by generating candidates to complete a code fragment when it correctly predicts the tag name or attribute name that a user intends to enter after a few characters have been typed.

The disclosure is described with respect to the XAML language. However, it should be understood that the techniques described herein are not limited to XAML and can be readily applied to other hierarchically-structured languages.

In XAML, there are two main categories of objects: an element and an attribute. An element declares the instance of a type and the attribute declares properties of the type. A property extends the capability of the type.

An element is delimited by a start tag and an end tag or an empty element tag. All elements except the root element have a parent element. There is a single root element and all other elements are subordinate to the root element or a parent element. All elements having the same parent element are considered siblings or sisters. An element has a type or name and may have a set of attributes. An attribute contains additional information about an element. An attribute has a name and a value.

A tag identifies the start and end of an element. A tag starts with an opening angle bracket "<" followed by an element name, zero or more spaces separated by attribute/value pairs, and a closing angle bracket ">". Properties of an element are expressed as attributes. The syntax of an attribute names the property and its value.

For example, "<Window>" is a start tag with no attributes and "<Window Class="HelloWorldMainWindow">" is a start tag having the name "Window" with the attribute "Class" whose value is "HelloWorldMainWindow." An end tag includes an opening angle bracket followed by a forward slash, the element name, and a closing angle bracket. For example, "</Window>" is an end tag for the Window element.

In a markup language, all of the elements need to be contained within a hierarchy of elements that starts with a root element. The first element to appear is a root element. There is one root element and the root element encapsulates all other elements. The hierarchical structure of the elements in a markup language is conceptually interpreted as a tree structure. The tree or hierarchical structure has a root element and branches out to the lowest level of elements.

In one aspect, candidates for predicting a tag name are based on a first-order tag Markov chain model generated from usage patterns of sequences of tag names found in various programs. The tag Markov chain model is used to predict the tag name most likely to complete a marker character as a user types based on the parent tag name preceding the marker character. A marker character is a character that indicates that a tag name or an attribute name will immediately follow the marker character. For example, in XAML, after the user types the right angle bracket, "<", the tag Markov chain model is invoked to predict the tag name that comes after the right angle bracket based on the preceding parent tag in the source code.

Candidates for predicting an attribute name are based on a second-order attribute Markov chain model generated from usage patterns of sequences of attribute names associated with each tag name found in various programs. The attribute Markov chain model is used to predict the attribute name most likely to succeed a marker character based on a preceding tag name and a sequence of preceding attribute names.

Attention now turns to a further discussion of the system, devices, components, and methods utilized in a code completion system.

Machine Learning Code Completion System

FIG. 1 illustrates a block diagram of an exemplary system 100 in which various aspects of the invention may be practiced. As shown in FIG. 1, system 100 includes a training phase 102 which generates the tag/attribute model 118 and a code completion phase 104 that utilizes the tag/attribute model 118 in a real-time code completion system. The training phase 102 may utilize a source code extraction component 108, a usage extraction component 112, and a model generation component 116. The code completion phase 104 may utilize a source code editor 120, a tag/attribute completion component 132, and the tag/attribute model 118.

In the training phase 102, the source code extraction component 108 extracts selected source code programs 110 from a source code repository 106 to generate training and validation datasets. The source code repository 106 is a file archive and web hosting facility that stores large amounts of source code either privately or publicly. The source code repository 106 can be structured as a version control system, such as GIT, Mercurial, etc. The source code programs residing in the source code repository 106 vary and may be written in different languages. The source code extraction component 108 obtains source code programs written in the same language. The source code programs can come from different domains, such as without limitation, scientific computing, web development, dataflow programming, machine learning, and the like but are written in the same language.

The usage extraction component 112 parses each selected source code program to extract tag/attribute relationship data into extracted data files 114. The extracted tag/attribute relationship data lists the tag names declared in the source code program, the hierarchical relationships between the tag names (e.g., parent, child, sibling, grandparent), the attributes associated with each tag name and the ordered sequences of attribute names found within each tag name in source code program.

In each selected source code program, there is at least one root tag name associated with a root element. The root element may have one or more child tag names. A child tag name may be a parent to other child tag names. Child tag names having the same parent tag name are considered sibling tag names. The tag/attribute relationship data in the extracted data files 114 is then used as the training dataset and the validation dataset used to train and test the tag/attribute model 118.

The tag/attribute model 118 is then configured for use in a code completion system. The code completion phase 104 may include a source code editor 120, a tag/attribute completion component 132, and the tag/attribute model 118. The source code editor 120 may include a user interface 122 and a parser 124. In one or more aspects, code completion may be a function or feature integrated into a source code editor and/or integrated development environment (IDE). Code completion may be embodied as a tool or feature that can be an add-on, plug-in, extension and/or component of a source code editor and/or IDE.

The user interface 122 includes a set of features or functions for writing and editing a source code program. The user interface 122 may utilize a pop-up window to present a list of possible candidates for completion thereby allowing a developer to browse through the candidates and to select one from the list. The parser 124 reads the source code in the source code editor 130 and generates a corresponding syntax tree. The parser 134 also updates the syntax tree as the developer creates and edits the source code in the source code editor 130 in order to recognize the tag names and the attribute names in their respective context.

At certain points in the editing process, the user interface 122 will detect that the user has entered a particular input or marker character which will initiate the code completion process. In one aspect, the left angle bracket "<" is used to initiate code completion for a tag name and a blank space after a tag name is used to initiate code completion for an attribute name.

The tag/attribute completion component 132 receives requests 128 for candidates to complete a tag or attribute name. In the case of completing a tag name, the tag/attribute completion component 132 extracts the parent tag name in the current context in order to obtain one or more candidates to complete a tag name. In the case of completing an attribute name, the tag/attribute completion component 132 extracts the tag name in the current context and the immediately preceding attribute sequence to obtain one or more candidates to complete an attribute name.

The tag/attribute model 118 may be formatted in a lookup table format, such as a dictionary or key-value table. In the case of completing a tag name, a parent name is used as the key to search for tag names to return as candidates. The tag names are listed in a ranked order with the tag name having the highest probability listed first. In the case of completing an attribute name, a tag name and the immediately preceding sequence of attributes is used as the key to search for attribute names to return as candidates. The attribute names are listed in a ranked order with the attribute name having the highest probability listed first.

The tag/attribute completion component 132 obtains one or more candidates 130 from the model 118 which are returned back to the user interface 122. In one aspect, at most five candidates are obtained. The user interface 132 in turn provides the candidates 130 to the developer. In one aspect, the user interface 132 may provide the candidates 130 from the tag/attribute completion component 132 with other candidates from other code completion tools and/or provide the candidates 130 from the tag/attribute completion component 132 separately. The techniques describe herein are not constrained to any particular mechanism for providing the candidates to a developer and the manner in which the candidates are displayed to the user (e.g., pop-up window, etc.).

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, the training phase 102 may be executed in one computing environment and the code completion phase 104 may be executed in the same computing environment or in a separate computing environment.

FIGS. 2A-2C illustrate the extraction of training data from a source code file to train the tag/attribute model. FIG. 2A shows a portion of source code written in the XAML language. FIG. 2B illustrates a JavaScript Object Notation (JSON) file representing the extracted features from the source code shown in FIG. 2A. FIG. 2C illustrates the tag/attribute model representing the source code shown in FIG. 2A in an exemplary XAML file.

Referring to FIG. 2A, lines 10-25 declare the element, Window. The Window element includes lines 19 to 23 that declare the Grid element and lines 20 to 22 that declare the TextBlock element. The hierarchical structure in this code segment shows the Window element as the parent element, the Grid element as a child of the Window element, and the TextBox element is the child of the Grid element.

The Window element has the following attributes: x:class at line 10 with a value of "HelloWorld.MainWindow"; xmlns at line 11 with a value of http://schemas.microsoft.com/winfx/2006/xaml/presentation; xmlns:x at line 12 with a value of http://schemas.microsoft.com/winfx/2006/xaml; xmlns:d at line 13 with a value of http://schemas.microsoft.com/expression/blend/2008; xmlns:mc at line 14 with a value of http://schemas.openxmlformat.org/markup-compatibility/2006; xmlns.local at line 15 with a value of "clr.namespace.HelloWorld"; mc:Ignorable at line 16 with a value of "d"; Title at line 17 with a value of "MainWindow"; Height at line 17 with a value of "350"; Width at line 17 with a value of "525"; and Icon at line 17 with a value of "app.ico".

The Grid element does not have any attributes. The TextBlock element has the following attributes: VerticalAlignment at line 20 with a value of "Center"; and HorizontalAlignment at line 20 with a value of "Center".

The usage extraction component 112 parses the source code to extract the tag names and the relationships between the tag names and to extract the attribute names and the relationships between the attribute names. The usage extraction component 112 generates a file representing the extracted tag and attribute data. In one aspect, the file is a JSON file.

Turning to FIG. 2B, there is shown an extracted data file 202 output by the usage extraction component 112. The extracted data file 202 may be implemented as a JSON file having the extracted tag names and attribute names from the source code file shown in FIG. 2A. The extracted data file 202 represents the tag and attribute names in a format that describes the relationships between the elements and the attributes. As shown in FIG. 2B, lines 31-45 represent the Window element, lines 46-51 represent the Grid element, and lines 52-58 represent the TextBlock element. Lines 25-29 are a header that identifies the XAML file from which the data has been extracted.

Line 31 identifies the tag name for the Window element, "Tag":"Window". Line 32, "Parents": [null, null]" lists the parent and grandparent of the Window element. Both of these relationships are null indicating that the Window element does not have a parent and grandparent and as such, the Window element is the root element. Line 33, "Sisters": [null, null]" indicates that the Window element does not have any siblings or sisters. Lines 34-44 list all the attributes of the Window element extracted from the XAML file.

Line 47, "Tag":"Grid", identifies the tag name for the Grid element. Line 48, "Parents": ["Window", null] lists the parent of the Grid element as the Window element and the null value indicates that there is no grandparent. Line 49, "Sisters": [null, null], indicates that the Grid element has no siblings and line 50, "Attributes":[ ], indicates that the Grid element does not have any attributes.

Lines 52-58 represent the TextBlock element. Line 53, "Tag": "TextBlock", identifies the tag name for the TextBlock element. Line 54, "Parents": ["Grid", "Window"], identifies that the TextBlock element has the Grid element as its parent and the Window element has its grandparent. Line 55, "Sisters": [null, null], indicates that the TextBlock element does not have any siblings since the values are null. Lines 56-57 lists the attributes of the TextB lock element.

The model generation component 116 uses the tag/attribute JSON files derived from each source code file to train a tag and an attribute model. In one aspect, the tag model is a first-order Markov chain model and the attribute model is a second-order Markov chain model. A Markov chain model relies on the assumption that each state is dependent on previous states. The dependency is given by a conditional probability $P(x_t|x_{t-1}, \ldots, x_{t-N})$, where $x_t$ is the state of the model at time t and n is the order of the Markov chain. In a first order Markov chain, a state is dependent only on the immediately preceding state and in a second order Markov chain model, a state is dependent on the immediately preceding two states.

In this disclosure, a Markov chain model represents the hierarchical relationships of the data as sequences. The tag Markov chain model represents as sequences the hierarchical relationships between tags such as the hierarchical relationship of a parent tag name with its child tag names. The attribute Markov chain model represents the hierarchical relationships between a tag and the ordered sequences of attributes within the tag.

In one aspect, the tag Markov chain model is a first-order Markov chain model that represents a sequence of a parent tag name followed by its child tag name with a transition probability indicating a likelihood of transitioning between the parent tag name and the child tag name. The transition probability from the parent tag name to the child tag name is computed as $P(x_1|x_0)=N_1/N_{total}$, where $N_1$ is the number of times $x_1$ comes after $x_0$, $x_1$ represents the child tag name, $x_0$ represents the parent tag name, and $N_{total}$ is the total number of tag names that descend from $x_0$.

In one aspect, the attribute Markov chain model is a second-order Markov chain model represents a sequence of attribute names for a particular tag name. There is a transition probability for the attributes in the attribute sequence which is computed as $P(x_t|x_{t-1}, \ldots, x_{t-n})=N_t/N_{total}$, where n is the order of the Markov chain, $N_t$ is the number of times $x_t$ comes after $x_{t-1}$ and $x_{t-2}$, $N_{total}$=total number of attributes that come after $x_{t-1}$ and $x_{t-2}$. There is an attribute model for each tag.

FIG. 2C illustrates an exemplary tag/attribute model derived from the extracted data shown in FIG. 2B and from the source code shown in FIG. 2A. In one aspect, the tag/attribute model is formatted as an XAML file.

Line 66 identifies the model name and line 67 identifies that the file is a model. Lines 68-72 represent the tag name model and lines 73-90 represent the attribute model. The tag model is indexed by a parent tag name and lists a child tag name. The child tag names are listed based on the frequency of the child tag occurring in usage patterns after a parent tag in the training data. Line 69 indicates that when there is no parent tag name, the Window tag name is most likely to follow. Line 70 indicates that the Grid tag name is most likely to follow the Window tag name. Line 71 indicates that the TextBlock tag name is most likely to follow the Grid tag name.

Line 73 identifies the start of the Attribute Model. There is an attribute model for each tag. Lines 74-85 represent the attribute model for the tag name Window and lines 86-89 represent the attribute model for the TextBlock tag name. Each attribute model is indexed by an ordered sequence of two attribute names and provides a third attribute name most likely to appear after the ordered sequence. For example, referring to line 76, is used when the user types characters within the tag element, Window, and a marker character is detected indicating that an attribute name is needed. When there is no previous ordered sequence of attribute names, the tag Window and a null character, "N", is used to search the tag/attribute model and the attribute "x:Class" is recommended. Referring to line 81, when the user types characters within the tag element, Window, and the preceding sequence of attributes includes "xmlns:mc" followed by "xmlns:local" then the attribute "Title" is recommended.

Figure 3:
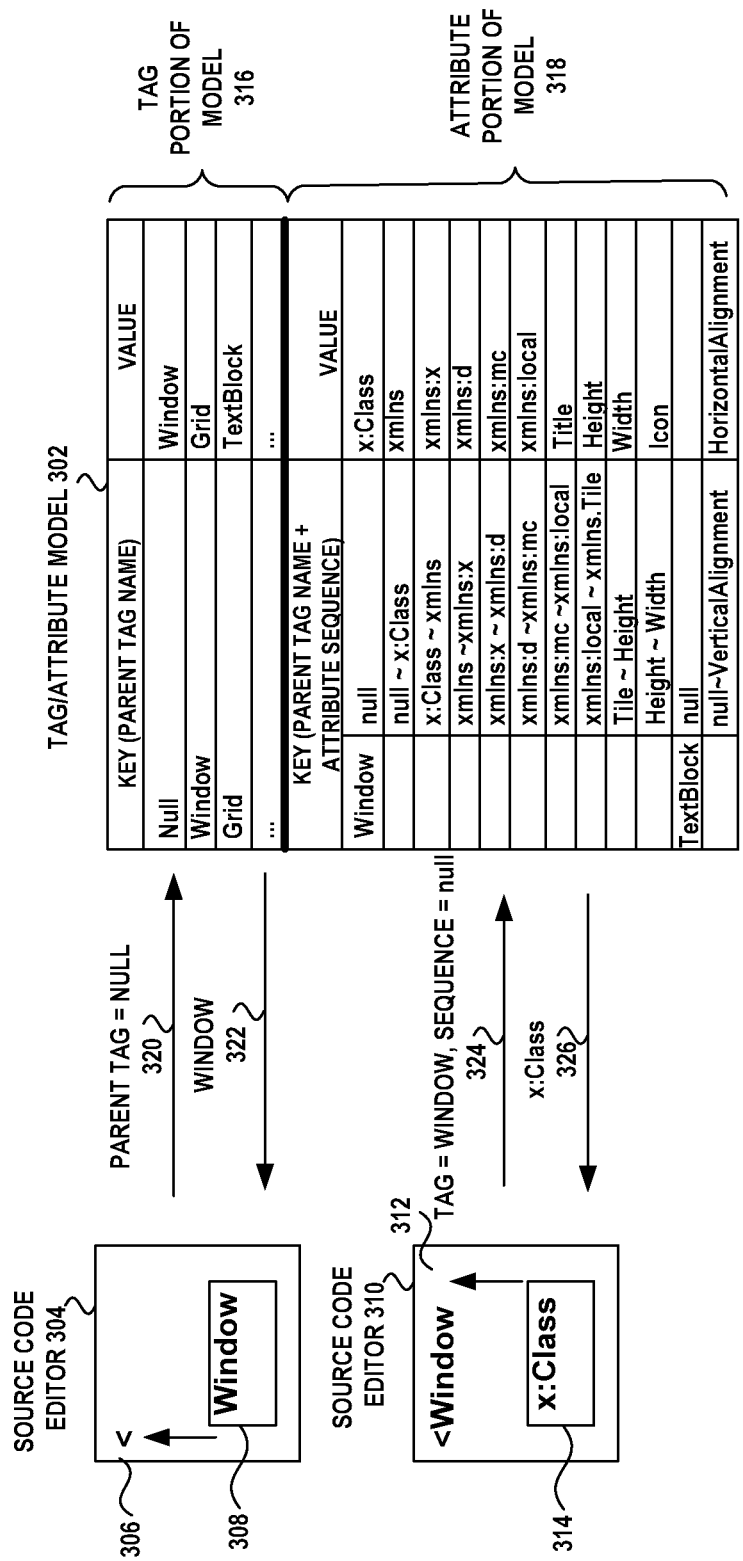
FIG. 3 is a schematic diagram illustrating an example of the usage of the tag/attribute model.

The tag/attribute name model may be implemented as dictionary, table lookup, key-value pair table, etc. FIG. 3 shows the tag/attribute model 302 formatted as a table of key-value pairs. The tag/attribute model 310 has a tag portion 316 and an attribute portion 318. The tag portion 316 is accessed through a key containing a parent tag name and the attribute portion 318 is accessed through a key containing a tag name and an attribute name sequence.

As shown in FIG. 3, a user types in a marker character 306 in source code editor 304 indicating that a tag name is next. In this example, the marker character 306 is a left angle bracket, "<". A lookup is performed in the tag portion 316 of the tag/attribute model 302 using a key having a null value for the parent tag 320. The value "Window" is returned to the source code editor 304 as the recommended tag name 322 to add into the source code editor 304.

A user types in a marker character 312 in a source code editor 310 for an attribute tag name. In this example, the marker character 312 is a blank space after the Window tag name. A lookup is performed in the attribute portion 318 of the tag/attribute model 302 using a key having the word "Window" as the tag and a null value for the sequence 324. The value "x:Class" is returned as the recommended attribute name 326 to add into the source code editor 310.

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
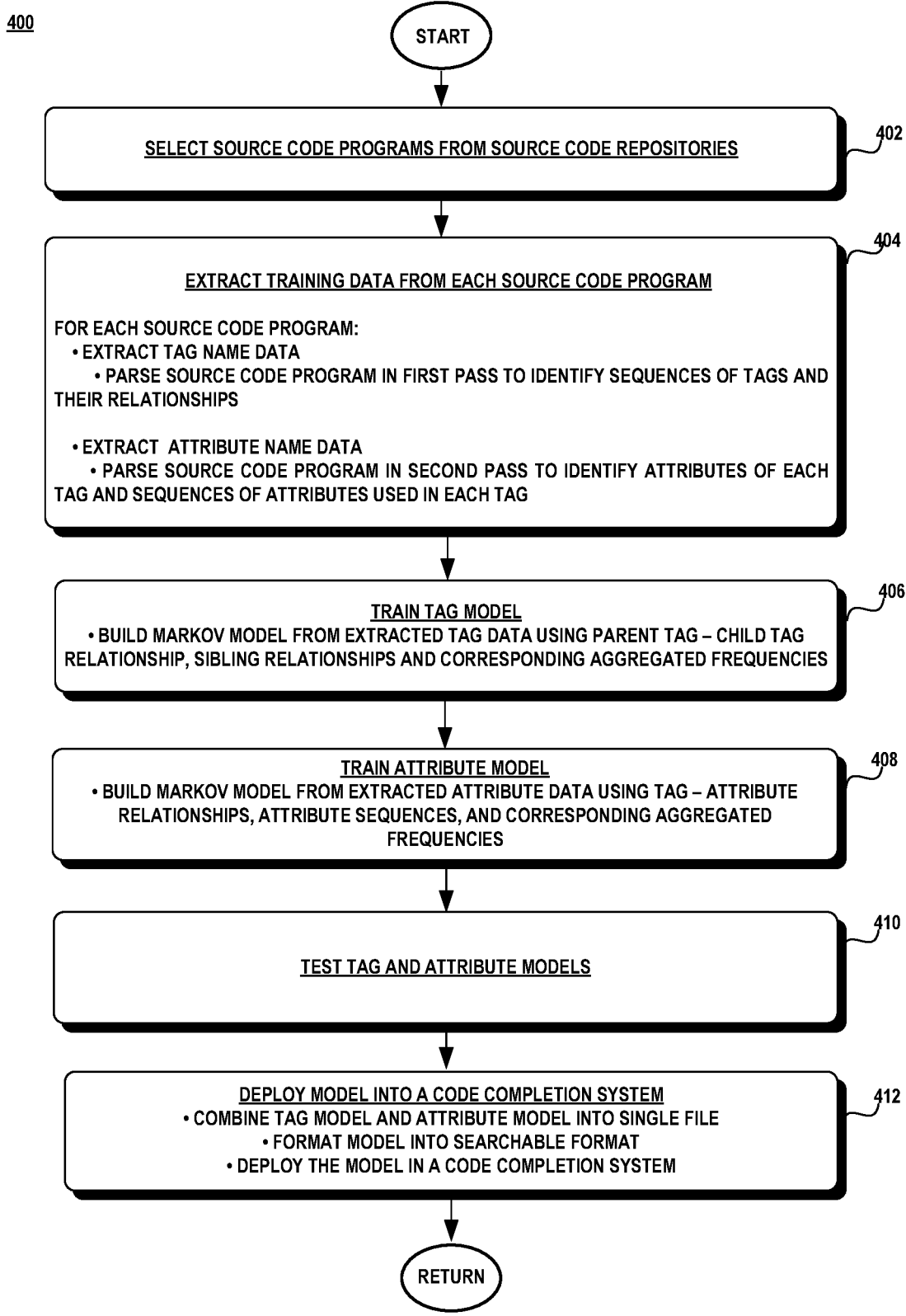
FIG. 4 is a flow diagram illustrating an exemplary method for training the tag/attribute model.

FIG. 4 illustrates an exemplary method illustrating the training of the tag/attribute model for code completion. Referring to FIGS. 1 and 4, one or more source code repositories 106 are searched for source code programs written in a target hierarchically-structured language. The source code repositories 106 can be widely-used code repositories, such as GitHub, internal code repositories, and/or combinations thereof. The source code extraction component 108 extracts a number and type of source code programs that meet an intended target, such as source code programs that are accessed frequently, source code programs that utilize a particular function (e.g., database operations, computer graphics programs, etc.), and the like. (Collectively, block 402).

The selected source code programs 110 are then parsed by the usage extraction component 112 to extract training and validation datasets for the tag name model and the attribute name model. The usage extraction component 112 parses each selected source code program 110 into a parse tree or syntax tree. In a first pass through the source code program, the usage extraction component 112 uses the parse or syntax tree to identity each tag name in a source code program 110 and the relationships between each tag name. The usage extraction component 112 identifies the root tag name, parent tag names, child tag names, and sibling tag names. The usage extraction component 112 parses each selected source code program 110 in a second pass using the parse or syntax tree to identify the attribute names associated with a tag name and the sequences of attributes used in each tag. (Collectively, block 404).

A tag name model is trained on the extracted tag data. The model generation component 116 uses the hierarchical relationships extracted from each selected source code program to build sequences of n+1 states, where n is the order of the Markov chain model and a state is a tag name or null. The transition probability between two states is based on the frequency that each state appears in a particular order in the sequence. The sequences and the frequencies are then used to create the first-order Markov model for the tag names. (Collectively, block 406).

The training data is analyzed to detect sequences of attribute names for each tag. For an n-order Markov chain model, the number of specific n state attribute name sequences that occur is counted to order the n+1 states that occur thereafter by derived probabilities. The derived probability may be generated by the ratio of the number of times the n+1 state sequence occurs over the number of times the n state sequence occurs (block 408).

The tag and attribute models are then tested to ensure a target level of accuracy (block 410). The testing entails providing each model with a validation dataset and checking the recommendations that the model outputs (block 410). When the recommendations achieve a certain level of accuracy, then the models are combined into a single file and transformed into a format suitable for quick retrieval, such as a dictionary or lookup table format, and deployed into a code completion system (block 412).

Figure 5:
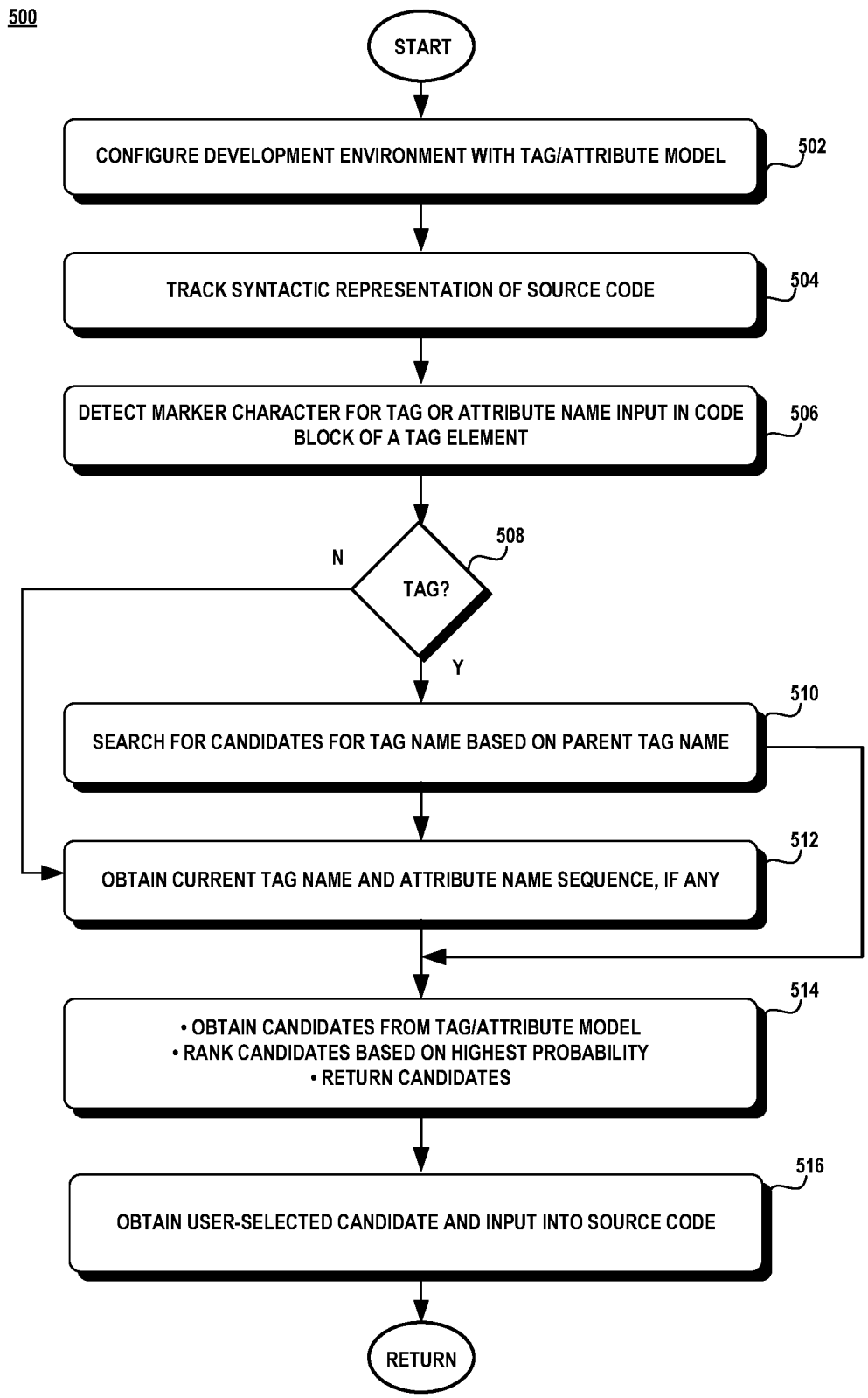
FIG. 5 is a flow diagram illustrating an exemplary method for utilizing the tag/attribute model for code completion.

FIG. 5 illustrates an exemplary method of code completion utilizing the tag/attribute model. Referring to FIGS. 1 and 5, code completion is performed in a development environment such as a source code editor 120 or integrated development environment (IDE). The source code editor 120 is configured to interact with a tag/attribute completion component 132 that utilizes the machine learning model in a lookup table format (block 502). The source code editor 120 performs a background parsing process that parses the source code in the source code editor to generate and update the parse or syntax tree of the source code thereby tracking the syntactic representation of the source code program (block 504).

The user interface 122 of the source code editor 120 detects the input characters that a developer enters into the source code editor 120. When the user interface 122 detects a marker character that denotes code completion is needed at a current position in the source code editor 120 which is inside a code block associated with a particular tag name, the user interface 122 requests 128 recommendations 128 candidates 130 from the tag/attribute completion component 132 (block 506). If the marker character indicates a tag name is needed (block 508-Y), then the tag/attribute completion component 132 searches for a tag name based on the parent tag name associated with the current context (block 510). If the marker character is within a code block associated with a particular tag name and indicates that an attribute name is needed (block 508-N), then the tag/attribute completion component 132 searches for an attribute name based on the current tag name and the immediately preceding sequence of attribute names (block 512). If there is no such n-state sequence, then the dictionary is searched using an n−1 state sequence constructed from the previous n−1 attributes in the same tag. If the n−1 state sequence cannot be found in the dictionary, then the n−2 state sequence is used to search the dictionary. In an n-order Markov chain model, the n−1 state sequence will be stored as a new n state sequence with the first state marked as null.

The tag/attribute completion component 132 utilizes the tag/attribute model 118 to produce candidates 130 to complete the code fragment (block 514). In the event that there are multiple candidates, the tag/attribute completion component 132 orders the recommendations by highest probability (block 514). The candidates are then returned to the user interface for display to the developer (block 514). A user-selected candidate is then input into the source code program (block 516).

Exemplary Operating Environment

Figure 6:
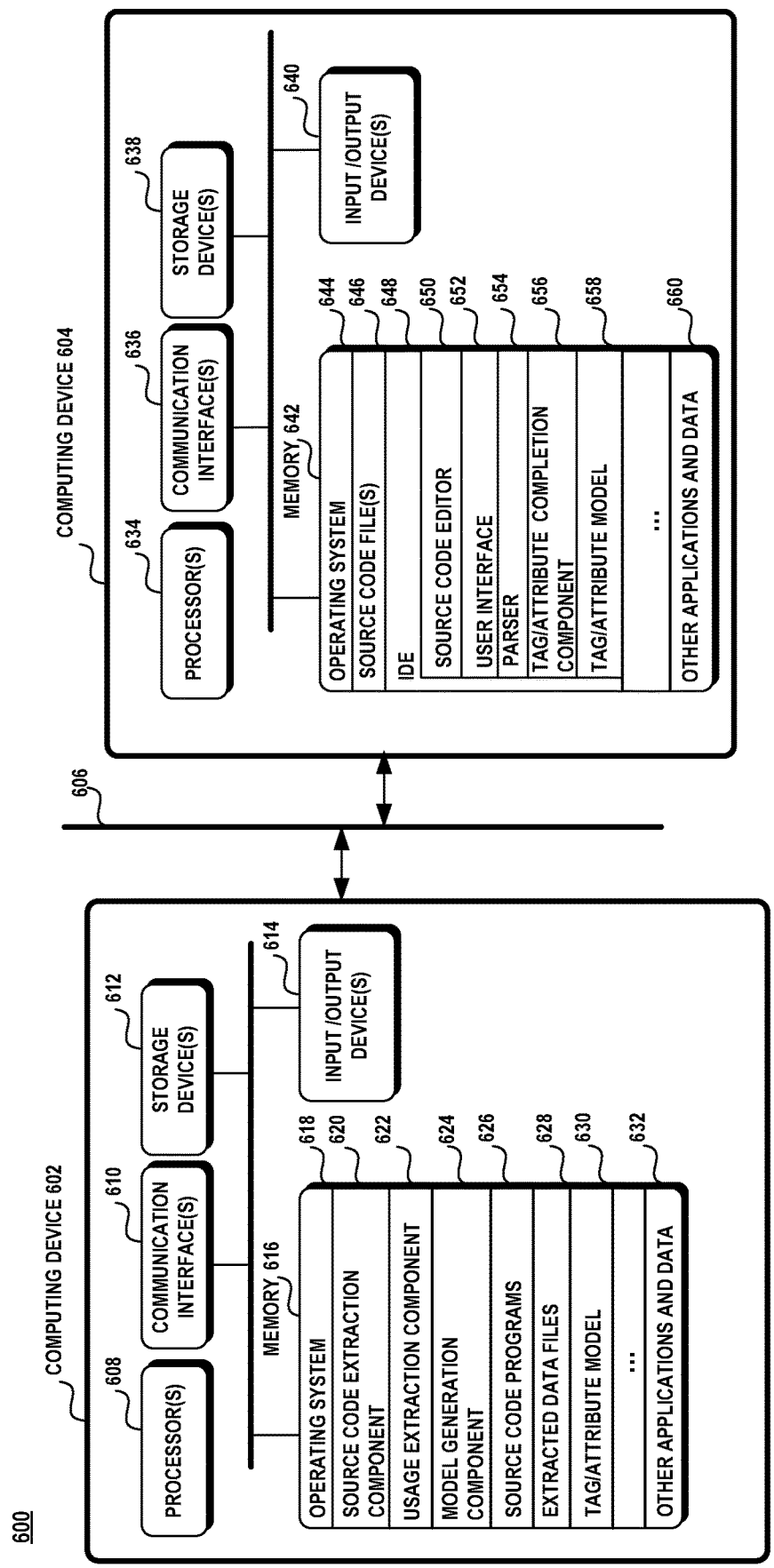
FIG. 6 is a block diagram illustrating an exemplary operating environment.

Attention now turns to a discussion of an exemplary operating environment. FIG. 6 illustrates an exemplary operating environment 600 in which a first computing device 602 is used to train the machine learning model and a second computing device 604 uses the machine learning model for code completion. However, it should be noted that the aspects disclosed herein is not constrained to any particular configuration of devices. Computing device 602 may utilize the machine learning model in its own code completion system and computing device 604 may generate and test machine learning models as well. Computing device 602 may be configured as a cloud service that generates the tag/attribute model as a service for other code completion systems. The operating environment is not limited to any particular configuration.

The computing devices 602, 604 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

The computing devices 602, 604 may include one or more processors 608, 634, one or more communication interfaces 610, 636, one or more storage devices 612, 638, one or more input/output devices 614, 640, and at least one memory or memory device 616, 642. A processor 608, 634 may be any commercially available or customized processor and may include dual microprocessors and multi-processor architectures. The communication interface 610, 636 facilitates wired or wireless communications between the computing device 602, 604 and other devices. A storage device 612, 638 may be computer-readable medium that does not contain propagating signals, such as modulated data signals transmitted through a carrier wave. Examples of a storage device 612, 638 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 612, 638 in the computing devices 602, 604. The input/output devices 614, 640 may include a keyboard, mouse, pen, voice input device, touch input device, display, speakers, printers, etc., and any combination thereof.

A memory 616, 642 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 616, 642 may also include one or more external storage devices or remotely located storage devices that do not pertain to propagated signals, such as modulated data signals transmitted through a carrier wave.

Computing device 604 may utilize an integrated development environment (IDE) 648 that allows a user (e.g., developer, programmer, designer, coder, etc.) to design, code, compile, test, run, edit, debug or build a program, set of programs, web sites, web applications, and web services in a computer system. Software programs can include source code files created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE may provide a native code development environment or may provide a managed code development that runs on a virtual machine or may provide a combination thereof. The IDE may provide a managed code development environment using the .NET framework. It should be noted that this operating embodiment is not constrained to providing the source code development services through an IDE and that other tools may be utilized instead, such as a stand-alone source code editor and the like.

A user can create and/or edit the source code files 646 according to known software programming techniques and the specific logical and syntactical rules associated with a particular source language via a user interface 652 and a source code editor 650 in the IDE 648. Thereafter, the source code files 646 can be parsed via a parser 654, such as a front end or language compiler. During this parsing process, the parser generates data structures representing the hierarchical relationship between the elements of the source code.

The memory 642 may contain instructions, components, and data. A component is a software program that performs a specific function and is otherwise known as a module, program, and/or application. The memory 642 may include an operating system 644, one or more source code files 646, an IDE 648 that may include a source code editor 650, a user interface 652, a parser 654, a tag/attribute completion component 656, and a tag/attribute model 658, and other applications and data 660. Memory 616 may include an operating system 618, a source code extraction component 620, a usage extraction component 622, model generation component 624, source code programs 626, extracted data files 628, a tag/attribute model 630, and other applications and data 632.

The computing devices 602, 604 may be communicatively coupled via a network 606. The network 606 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 606 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed having one or more processors and at least memory device communicatively coupled to the one or more processors. The system also includes one or more programs, wherein the one or more programs are stored in the memory device and configured to be executed by the one or more processors. The one or more programs include instructions that: detect a user inputting a marker character within an element of a source code program, the marker character associated with placement of a tag name or attribute name to complete a code fragment in the source code program, the code fragment written in a hierarchically-structured language; obtain, from a machine learning model, at least one candidate tag name or candidate attribute name to complete the code fragment; and input a user-selected tag name or a user-selected attribute name into the source code program.

The one or more programs include further instructions that: determine that the marker character is associated with a tag name; obtain a parent tag name associated with the code block; and input the parent tag name into the machine learning model to obtain the at least one candidate tag name. The one or more programs also includes further instructions that: determine that the marker character is associated with the at least one attribute name; obtain a tag name associated with the code block and an attribute sequence of attribute names immediately preceding the marker character; and input the tag name and the attribute sequence into the machine learning model to obtain the at least one candidate attribute name.

The machine learning model is based on at least one n-state Markov model. The machine learning model includes an n-state attribute Markov chain model to produce the at least one attribute name to complete the first code fragment.

The one or more programs include further instructions that: monitor tag names within the source code program as a user inputs characters in order to obtain a tag name associated with a current position of the marker character and monitor attribute names within the source code program as a user inputs characters in order to obtain one or more attribute names associated with the current position of the marker character.

A method is disclosed comprising: obtaining, in a computing device having at least one processor and at least one memory device, a tag model having one or more parent tag names, a parent tag name associated with one or more child tag names, a child tag name associated with a probability of appearing in a tag associated with the parent tag name; determining a current parent tag name associated with a current first position in a source code program written in a hierarchically-structured language as the source code program is being edited; using the tag model to obtain a child tag name associated with the current parent tag name, the child tag name associated with the current parent tag name having a highest probability; and inputting the child tag name into the current first position of the source code program.

The method includes further actions of obtaining an attribute model representing sequences of attribute names used in a tag element; determining a current tag name associated with a current second position in the source code program; composing an attribute sequence of one or more attribute names used in a current tag prior to the current second position; and using the attribute model to predict an attribute name to input at the current second position based on the current tag name and the attribute sequence. The tag model is a first-order Markov chain model and the attribute model is a second-order Markov chain model.

The method includes further actions comprising: constructing a syntax tree of the source code program as the source code program is being edited; and using the syntax tree to determine the parent tag name of the current first position. The method further comprises: constructing a syntax tree of the source code program as the source code program is being edited; and using the syntax tree to determine the current tag name associated with the current second position. The tag model and the attribute model are formatted into a single file.

A device is disclosed having at least one processor communicatively coupled to at least one memory device. The at least one processor is configured to: obtain a plurality of source code programs written in a hierarchically-structured language; generate a tag model from the plurality of source code programs, the tag model representing one or more parent tag names used in the plurality of source code programs, a parent tag name associated with zero or more child tag names used in a parent tag element; associate a probability with each child tag name based on a frequency of a child tag name occurring within a parent tag element in the plurality of source code programs; and deploy the tag model into a code completion system to predict a tag name at a position in an edited source code program based on a current tag name associated with the position.

The at least one processor is further configured to: generate an attribute model from the plurality of source code programs, the attribute model indicating a likelihood of a candidate attribute name following an attribute sequence of a tag element, the attribute sequence including one or more attributes used in a tag element; associate a probability with a tag name and attribute sequence that a candidate attribute name is likely to follow the tag name and attribute sequence based on a frequency of the candidate attribute name following the tag name and attribute sequence in the plurality of source code programs.

The tag model is a first-order Markov chain model and the attribute model is a second-order Markov chain model. The at least one processor is further configured to: parse at least one source code program of the plurality of source code programs into a syntax tree; and extract tag data from the syntax tree to obtain hierarchical relationships between each tag in the at least one source code program, the tag data including parent-child tag relationships and sibling tag relationships. The at least one processor is further configured to: parse at least one source code program of the plurality of source code programs into a syntax tree; and extract attribute data from the syntax tree to obtain attribute relationships between each tag in the at least one source code program and attribute sequences with each tag in the at least one source code program.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors;
at least one memory device communicatively coupled to the one or more processors; and
one or more programs, wherein the one or more programs are stored in the memory device and configured to be executed by the one or more processors, the one or more programs including instructions to perform actions that:
detect a user inputting a marker character within an element of a source code program written in a hierarchically-structured programming language, the marker character denotes a position in a code fragment of the source code program where a tag name or attribute name is needed to complete the code fragment in the source code program, wherein the tag name and the attribute name are elements of the source code program;
obtain, from a machine learning model, at least one candidate tag name or at least one candidate attribute name to complete the code fragment; and
input the at least one candidate tag name or the at least one candidate attribute name into the source code program.

2. The system of claim 1, wherein the one or more programs include further instructions to perform actions that:
determine that the marker character is associated with a tag name;
obtain a parent tag name associated with a current context of the marker character; and
input the parent tag name into the machine learning model to obtain the at least one candidate tag name.

3. The system of claim 2, wherein the machine learning model is based on at least one n-state Markov model.

4. The system of claim 1, wherein the one or more programs include further instructions to perform actions that:
determine that the marker character is associated with the at least one attribute name;
obtain a tag name associated with a current context of the marker character and an attribute sequence of attribute names immediately preceding the marker character; and
input the tag name and the attribute sequence into the machine learning model to obtain the at least one candidate attribute name.

5. The system of claim 4, wherein the machine learning model includes an n-state attribute Markov chain model to produce the at least one attribute name to complete the code fragment.

6. The system of claim 4, wherein the one or more programs include further instructions to perform actions that:
monitor tag names within the source code program as a user inputs characters in order to obtain a tag name associated with a current position of the marker character.

7. The system of claim 6, wherein the one or more programs include further instructions to perform actions that:
monitor attribute names within the source code program as a user inputs characters in order to obtain one or more attribute names associated with the current position of the marker character.

8. A computer-implemented method, comprising:
editing a source code program written in a hierarchically-structured programming language, wherein the source code program comprises a plurality of tag elements, the plurality of tag elements including parent tag names and child tag names, wherein a parent tag name is related to one or more child tag names;
accessing from a first position in the source code program a parent tag name;
using a tag model to obtain a child tag name associated with the parent tag name, wherein the tag model comprises a plurality of parent tag names, each parent tag name associated with one or more child tag names in a ranked order based on a highest probability, wherein the obtained child tag name has the highest probability; and
inputting the obtained child tag name into the first position of the source code program.

9. The computer-implemented method of claim 8, further comprising:
obtaining an attribute model representing sequences of attribute names used in a tag element;
determining a current tag name associated with a second position in the source code program;
composing an attribute sequence of one or more attribute names used in a current tag prior to the second position; and
using the attribute model to predict an attribute name to input at the second position based on the current tag name and the attribute sequence.

10. The computer-implemented method of claim 9, further comprising:
constructing a syntax tree of the source code program as the source code program is being edited; and
using the syntax tree to determine the current tag name associated with the second position.

11. The computer-implemented method of claim 9, further comprising: formatting the tag model and the attribute model into a single file.

12. The computer-implemented method of claim 8, wherein the tag model is a first-order Markov chain model.

13. The computer-implemented method of claim 8, wherein the attribute model is a second-order Markov chain model.

14. The computer-implemented method of claim 8, further comprising:
constructing a syntax tree of the source code program as the source code program is being edited; and
using the syntax tree to determine the parent tag name of the first position.

15. A device, comprising:
at least one processor communicatively coupled to at least one memory device;
wherein the at least one processor is configured to perform acts that:
obtain a plurality of source code programs written in a hierarchically-structured programming language, the plurality of source code programs including a plurality of tag names and/or attribute names, wherein a tag name represents an element of a source code program, an attribute name represents a property of a corresponding tag name, wherein the plurality of tag names include parent tag names and child tag names;
generate a tag model from the plurality of source code programs, the tag model representing one or more parent tag names used in the plurality of source code programs, a parent tag name associated with zero or more child tag names used in a parent tag element;
associate a probability with each child tag name based on a frequency of a child tag name occurring within a parent tag element in the plurality of source code programs; and
deploy the tag model into a code completion system to predict a tag name at a position in an edited source code program based on a current tag name associated with the position, wherein the edited source code program is written in the hierarchically-structured programming language.

16. The device of claim 15, wherein the at least one processor is further configured to perform acts that:
generate an attribute model from the plurality of source code programs, the attribute model indicating a likelihood of a candidate attribute name following an attribute sequence of a tag element, the attribute sequence including one or more attributes used in a tag element;
associate a probability with a tag name and attribute sequence that a candidate attribute name is likely to follow the tag name and attribute sequence based on a frequency of the candidate attribute name following the tag name and attribute sequence in the plurality of source code programs.

17. The device of claim 16, wherein the attribute model is a second-order Markov chain model.

18. The device of claim 16, wherein the at least one processor is further configured to perform acts that:
parse at least one source code program of the plurality of source code programs into a syntax tree; and
extract attribute data from the syntax tree to obtain attribute relationships between each tag name in the at least one source code program and attribute sequences with each tag name in the at least one source code program.

19. The device of claim 15, wherein the tag model is a first-order Markov chain model.

20. The device of claim 15, wherein the at least one processor is further configured to perform acts that:
parse at least one source code program of the plurality of source code programs into a syntax tree; and
extract tag data from the syntax tree to obtain hierarchical relationships between each tag name in the at least one source code program, the tag data including parent-child tag relationships and sibling tag relationships.

* * * * *